(12) United States Patent
Sinn

(10) Patent No.: US 8,418,244 B2
(45) Date of Patent: Apr. 9, 2013

(54) INSTANT COMMUNICATION WITH TLS VPN TUNNEL MANAGEMENT

(75) Inventor: Richard Sinn, Milpitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1311 days.

(21) Appl. No.: 11/741,278

(22) Filed: Apr. 27, 2007

(65) Prior Publication Data

US 2008/0271137 A1 Oct. 30, 2008

(51) Int. Cl.
*H04L 29/06* (2006.01)
(52) U.S. Cl. .......... 726/15; 713/151; 713/152; 713/153; 726/11; 726/12
(58) Field of Classification Search .................. 713/152; 726/15; 370/352
See application file for complete search history.

(56) References Cited

U.S. PATENT DOCUMENTS

| | | | | |
|---|---|---|---|---|
| 2003/0188001 | A1* | 10/2003 | Eisenberg et al. | 709/229 |
| 2003/0204741 | A1* | 10/2003 | Schoen et al. | 713/200 |
| 2004/0172464 | A1* | 9/2004 | Nag | 709/223 |
| 2006/0184998 | A1* | 8/2006 | Smith et al. | 726/3 |
| 2007/0078986 | A1* | 4/2007 | Ethier et al. | 709/227 |
| 2007/0121596 | A1* | 5/2007 | Kurapati et al. | 370/356 |
| 2007/0147350 | A1* | 6/2007 | Bangor et al. | 370/352 |

OTHER PUBLICATIONS

William Stallings, Cryptography and Network Security, 2003, Pearson Education, third edition, pp. 490-491.*

* cited by examiner

*Primary Examiner* — Brandon Hoffman
*Assistant Examiner* — Thomas C Lauzon
(74) *Attorney, Agent, or Firm* — Hickman Palermo Truong Becker Bingham Wong LLP; Daniel D. Ledesma

(57) ABSTRACT

Techniques are provided for securing instant communications, such as text, audio, and video. A tunnel management module is included in an instant communication suite that comprises one or more instant communication applications. Any communication between a user of the instant communicate suite and a contact passes through the tunnel management module, which may use TLS (or IPSec) technologies to ensure security of the instant communications. Each contact of a user may be associated with a different set of security mappings, which may be specified by the user. A tunnel configuration file is generated from a security mapping and is used to create a tunnel through which secure instant communications may pass.

18 Claims, 3 Drawing Sheets

INSTANT COMMUNICATION WITH TLS VPN TUNNEL MANAGEMENT

FIELD OF THE INVENTION

The present invention generally relates to instant communication and, more particularly, to adding security to instant communications.

BACKGROUND

Instant communication is a real-time communication between two or more people. Instant communication usually refers to instant (text) messaging but now includes other forms of communication, such as voice over IP and video over IP. An example of instant communication software is Yahoo! Messenger. A particular user has a downloadable client version of the software on his/her computer. The particular user establishes a relationship with another user by, e.g., inviting the other user to be a "friend" or "contact" of the particular user or by accepting an invitation from the other user to be a contact of the other user.

Instant communication has become a way of life for a large segment of Internet users, including commercial corporate users. Unfortunately, security has not been a primary concern over the last 10 years when such instant communication technologies have been developed.

One drawback of current instant communication software (such as Skype and AOL Instant Messenger) is that such software uses application-level packet encryption to provide security to instant communications. A result of this approach is that whenever an additional type of instant communication is added to an instant communication suite (e.g., adding voice over IP to text messaging) running on a user's computer, extensive rework of the instant communication suite is required.

Another drawback of current instant communication software is that the security policies are the same for all contacts of a user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
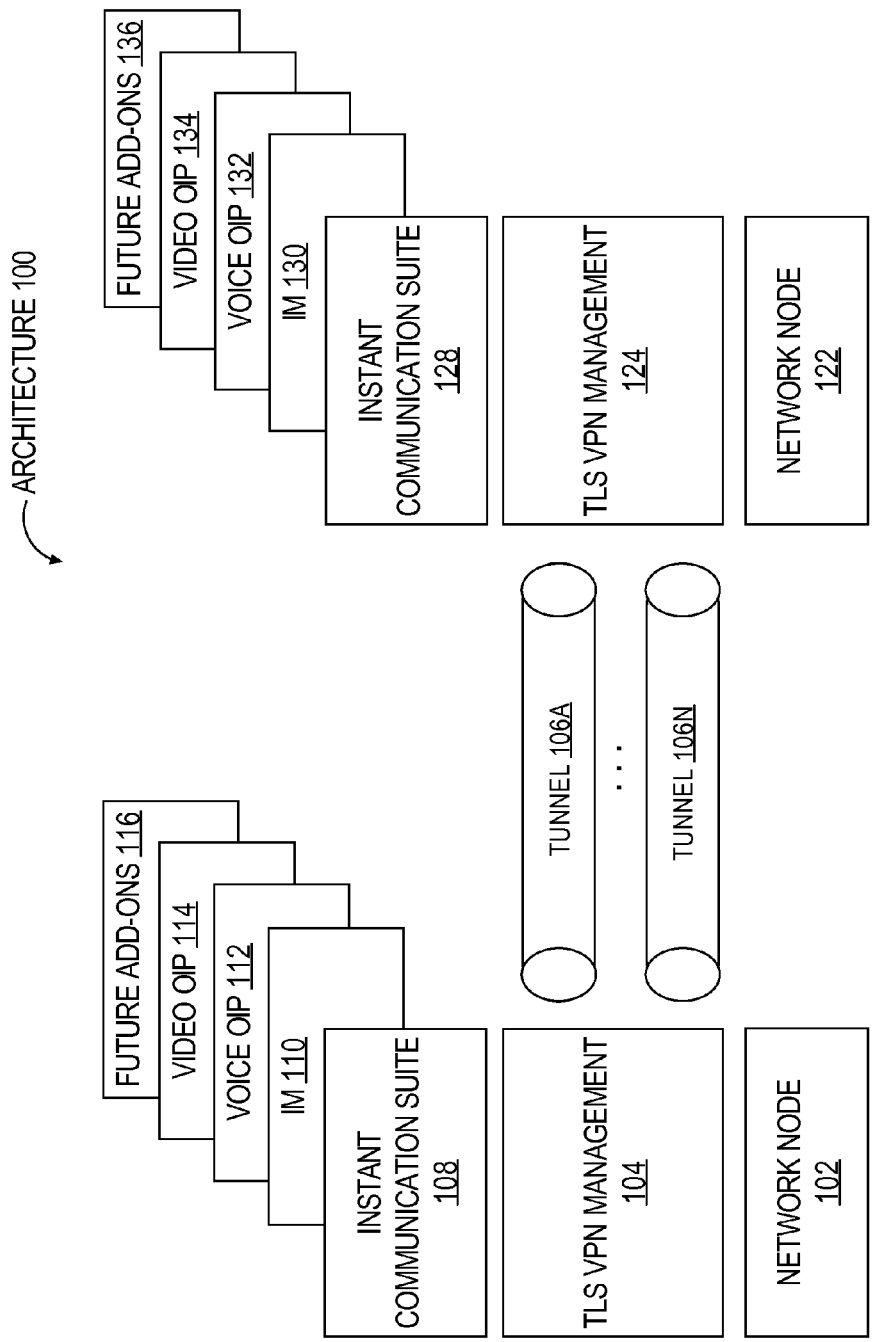
FIG. 1 is a block diagram that illustrates an overview of an example instant communication architecture, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to an embodiment of the invention, an instant communication suite contains a module for Transport Layer Security (TLS) Virtual Private Network (VPN) tunnel management. Such a tunnel management module acts as an intermediary between the instant communication suite and a computer with network access (referred to hereinafter as a "network node"). Thus, instant communications pass through the TLS VPN tunnel management software. With a TLS VPN management module, instant communications between network nodes are more secure, additional instant communication applications may be easily added to each network node, and adding additional security does not require major rework of any instant communication application.

An "instant communication suite" is a set of one or more instant communication applications that are provided by the same entity. The example given above for an instant communication suite is Yahoo! Messenger. Yahoo! Messenger includes multiple instant communication applications, such as text messaging, voice over IP, video over IP, and file sharing.

Virtual Private Network

A virtual private network (VPN) is a private data network that makes use of the public telecommunication infrastructure, maintaining privacy through the use of a tunneling protocol and security procedures. The idea of the VPN is to give a company the same capabilities provided by a strictly private, unshared infrastructure at much lower cost by using the shared public infrastructure rather than the private one.

Most VPNs rely on tunneling to create a private network that reaches across the Internet. Tunneling is the transmission of data through a public network in such a way that routing nodes in the public network are unaware that the transmission is part of a private network. Tunneling is generally done by encapsulating the private network data and protocol information within the public network protocol data so that the tunneled data is not available to anyone examining the transmitted data frames.

Transport Layer Security

Transport Layer Security (TLS) is a protocol that guarantees privacy and data integrity between applications communicating over the Internet. The TLS protocol is made up of two layers: the TLS Record Protocol and the TLS Handshake Protocol. The TLS Record Protocol is layered on top of a reliable transport protocol, such as Transmission Control Protocol (TCP), and ensures (1) that the connection is private by using symmetric data encryption and (2) that the connection is reliable. The TLS Record Protocol also is used for encapsulation of higher-level protocols, such as the TLS Handshake Protocol. The TLS Handshake Protocol involves authentication between applications and the negotiation of an encryption algorithm and cryptographic keys before the application protocol transmits or receives any data.

TLS is application protocol-independent. Higher-level protocols can layer on top of the TLS protocol transparently.

TLS is the latest version of Secure Sockets Layer (SSL) and is an enhancement of SSL version 3.0. TLS is also a proposed Internet Standard (see Request For Comment 2246).

Thus, a TLS VPN is a VPN that makes use of TLS technologies. A TLS VPN tunnel is an end-to-end communication channel that uses TLS VPN technologies to secure communication between two network nodes.

In an alternative embodiment, an IP Security (IPSec) VPN tunnel may be used instead of a TLS VPN tunnel. One drawback, however, of using IPSec VPN tunnels is that a IPSec VPN tunnel resides at a much lower level in the operating system of a network node, which requires a system restart whenever a major tunnel management operation is performed. Similar restarts are not required if TLS VPN tunnels are implemented.

Example Architecture

FIG. 1 is a block diagram that illustrates an overview of an example instant communication architecture 100, according to an embodiment of the invention. Architecture 100 comprises at least two nodes: a network node 102 and a network node 122. A TLS VPN management module 104 is part of instant communication suite 108 that executes on network node 102. Similarly, a TLS VPN management module 124 is part of instant communication suite 128 that executes on network node 122. Communications that are sent by instant communication suite 108 pass through TLS VPN management module 104. Similarly, communications that are sent by instant communication suite 128 pass through TLS VPN management module 124.

An instant communication suite comprises one or more instant communication applications or services. As illustrated in FIG. 1, instant communication suite 108 comprises an instant messaging service 110, a voice over IP service 112, and a video over IP service 114. Similarly, instant communication suite 128 comprises an instant messaging service 130, a voice over IP service 132, and a video over IP service 134. However, two nodes that communicate via instant communication might not comprise the same set of services, as long as the nodes have at least one compatible application or service through which the two nodes may communicate. For example, of the possible set of services, network node 102 might only comprise instant messaging service 110 and voice over IP service 112, whereas network node 122 might only comprise instant messaging 130.

As FIG. 1 illustrates, future add-ons 116 and 136 (e.g., applications or services may be added to instant communication suites 108 and 128, respectively, in the future. For example, a rich text transfer application may be added without requiring the rich text transfer application to know any thing about security. Any communication between newly added rich text transfer applications may obtain the same security benefits provided by their respective TLS VPN management modules without significant modification of the TLS VPN management modules. When a new application is added to the instant communication suite, there is no need to change the management module as long as the application uses the virtual IP address assigned by the management module.

Tunnel Management Module

A tunnel management module (e.g., TLS VPN management module 104) may manage one or more tunnels (e.g., a tunnel 106A through a tunnel 106N) from one network node to another network node (i.e., one-to-one). Additionally, a tunnel management module may manage one or more tunnels from one network node to multiple networks nodes (i.e., one-to-many). Each tunnel may be configured to use a different transport protocol, authentication method, compression method, cipher, etc.

A tunnel management module thus creates tunnels and destroys tunnels. The tunnel management module may borrow an operating system interface to destroy or delete tunnels. A tunnel management module may create a tunnel based on a tunnel configuration file, an example of which is provided below.

Tunnel Configuration File

The following is an example tunnel configuration file (in XML).

```
<tunnel_config>
    <port>1500</port>
    <mode>
        <transport>udp</transport>
        <tunnel>tun</tunnel>           <!-- tun creates a routed IP tunnel
                                            tap creates an ethernet tunnel -->
    </mode>
    <auth>
        <ca>keys/ca.pem</ca>           <!-- CA certificate -->
        <cert>keys/myhost.pem</cert>   <!-- host certificate -->
        <key>keys/mykey.pem</key>      <!-- key file -->
        <dh>keys/dh.pem</dh>           <!-- Diffie Hellman parameters for
                                            handshake -->
    </auth>
    <virtual>                          <!-- IP and subnet to draw virtual IP
                                            address from -->
        <ip>10.8.0.0</ip>
        <subnet>255.255.255.0</subnet>
    </virtual>
    <compression>lzo</compression>
    <keepalive>30</keepalive>          <!-- Interval to send keep alive packet-->
    <cipher>BF-CBC</cipher>            <!-- Encryption cipher to use -->
    <loglevel>3</loglevel>             <!-- Log level is from 1 to 5 -->
</tunnel_config>
```

From the above example tunnel configuration file, port 1500 is the port number that defines the port number of the local tunnel end-point. Any port that is not blocked by a network firewall can be used as the communication port.

The "mode" tag in the example tunnel configuration file identifies the transport protocol used and the type of tunnel used. Examples of transport protocols include TCP (as indicated above) and User Datagram Protocol (UDP). The value for the "tunnel" tag may be TUN or TAP.

TUN and TAP are virtual network kernel drivers that are utilized by a tunnel management module. TUN and TAP implement network devices that are supported entirely in software, which is different from ordinary network devices that are backed up by hardware network adapters. TUN (as in network TUNnel) simulates a network layer device and operates with Layer 3 packets such as IP packets. TAP (as in network TAP) simulates an Ethernet device and operates with Layer 2 packets such as Ethernet frames. Thus, TAP is used to create a network bridge, while TUN is used with routing. As a result, TUN is used for IP tunneling and TAP is used for Ethernet tunneling.

The "auth" tag in the example tunnel configuration file corresponds to the authentication required for instant communication. In this example file, four elements are listed: a certificate of a certificate authority (CA), a host certificate, a key file, and a file that specifies Diffie-Hellman parameters. Diffie-Hellman key exchange is a cryptographic protocol that allows two parties that have no prior knowledge of each other to establish jointly a shared secret key over an insecure communications channel. This key may then be used to encrypt subsequent communications using a symmetric key cipher.

The "virtual" tag in the example tunnel configuration file specifies an IP address and subnet from which a virtual IP address is selected. The local network node uses a virtual IP address as the source IP address in a packet that is sent to one or more remote network nodes. Any responses to the local network node from the one or more remote network nodes include the virtual IP address as the destination IP address. Any unused IP address in the local system can be used as the virtual IP address specified in the configuration. A link-local IP address is a good example.

The example tunnel configuration file further includes a "compression" tag, a "keepalive" tag, a "cipher" tag, and a "loglevel" tag. The "compression" tag specifies a data compression algorithm to apply to an instant communication. Embodiments of the invention are not limited to any particular compression algorithm. The compression algorithm identified in the configuration file above is "lzo," or the Lempel-Ziv-Oberhumer algorithm.

The "keepalive" tag specifies a number of time units in which the tunnel remains "idle" (i.e., no instant communications sent) after which another key exchange is initiated. The lower the keep alive value, the more secure the tunnel communication. An example of a relatively large keep alive value that indicates a non-secure communication is 100.

The "cipher" tag specifies an algorithm for performing encryption and decryption. Embodiments of the invention are not limited to any particular encryption-decryption algorithm. The encryption-decryption algorithm specified above is BF-CBC, which stands for blowfish encryption in cipher-block chaining (CBC) mode.

The "loglevel" tag specifies a value that indicates an amount of detail to log in the set of communications that are sent using the tunnel. The scale may be, e.g., 1 to 5, where 5 indicates the most detail and 1 indicates that only the most critical errors are logged.

Security Mapping

According to an embodiment of the invention, when an instant communication suite (e.g., a Yahoo! Messenger client) logs into a central server, the instant communication suite obtains a listing of security requirement mappings between the user and the contacts of the user. Additionally or alternatively, the security requirement mappings may be downloaded periodically (automatically) and/or on demand (i.e., based on the user's instructions).

Any local change to the security mapping by the user may be uploaded back to the central server. The central server serves as a centralized warehouse for security mapping information. The security mapping may be downloaded to any location and/or computer where the user logs on.

Situations may arise where the security mappings between two users may be different. In such situations, there are at least two cases in which the security mapping differences between the users may be reconciled. In case 1, user A has a security mapping between user A and user B, but user B does not have a security mapping between user B and user A. In that case, the security mapping of user A will be used.

In case 2, both user A and user B have a security mapping between users A and B but the security mappings are not the same. In a default scheme, the initiator's mapping will be used. For example, if the first message is sent from user A to user B, then user A's security mapping will be used. Under a default scheme, the tunnel management module instructs the application on the receiving side to prompt the user either to reject the instant communication or to change the security mapping to be the same as the sending side.

The following is an example security mapping file (also in XML).

```
<security_mapping>
    <user name=RichardTheBusinessPartner>
        <compression>lzo</compression>
        <auth>cert</auth>
        <cipher>BF-CBC</cipher>
        <keepalive>10</keepalive>
    </user>
    <user name=CarmenTheGirlFriend>
        <compression>lzo</compression>
        <auth>statickey</auth>
        <cipher>3DES-CBC</cipher>
        <keepalive>50</keepalive>
    </user>
    <user name=PeterTheFriend>
        <compression>none</compression>
        <auth>none</auth>
        <cipher>none</cipher>
        <keepalive>100</keepalive>
    </user>
</security_mapping>
```

Three different types of configurations are shown above, one for each of three contacts. The "RichardTheBusinessPartner" contact requires lzo compression, certificate authentication, blowfish encryption in CBC mode, and a small interval of keep alive packet sending.

The "CarmenTheGirlFriend" contact requires zip compression, static key authentication, 3DES (Triple Data Encryption Standard) encryption in CBC mode, and a middle length interval of keep alive packet sending.

The "PeterTheFriend" contact requires no secure communication, including no compression and no authentication.

Based on the security mapping file above, a different tunnel configuration file may be generated for each contact. Therefore, one tunnel configuration file is generated for "RichardTheBusinessPartner", one for "CarmenTheGirlFriend", and one for "PeterTheFriend". The tunnel management module then creates a different tunnel according to each tunnel configuration file. If the security mapping is the same for two or more contacts, then the tunnel management module might only have to generate one tunnel configuration file from which a tunnel is created for each of the two or more contacts.

Once a tunnel is created for a particular contact, peer-to-peer communications between the network node of the user and the network node of the particular contact use the tunnel. As a result, instant communication may be customized for different levels of security. As the tunnel and security mapping information is dynamic, instant communication between friends can be changed easily.

One difference between the VPN created between two users using embodiments of the invention and a traditional VPN is that traditional VPN requires strict authentication of a user to an organization where the whole client node is then included in a trusted network. This invention describes a way of selectively constructing VPN communication through point to point tunneling among users in a public instant communication network. A user of a traditional VPN is a strict user that belongs to an organization to which the user must apply. Alternatively, a user of embodiments of the invention is from a public network (e.g., Yahoo!) and embodiments of the invention provide selectively secure communication among friends whose associated security mappings may be configured by the user.

Example Flow Diagram

Figure 2:
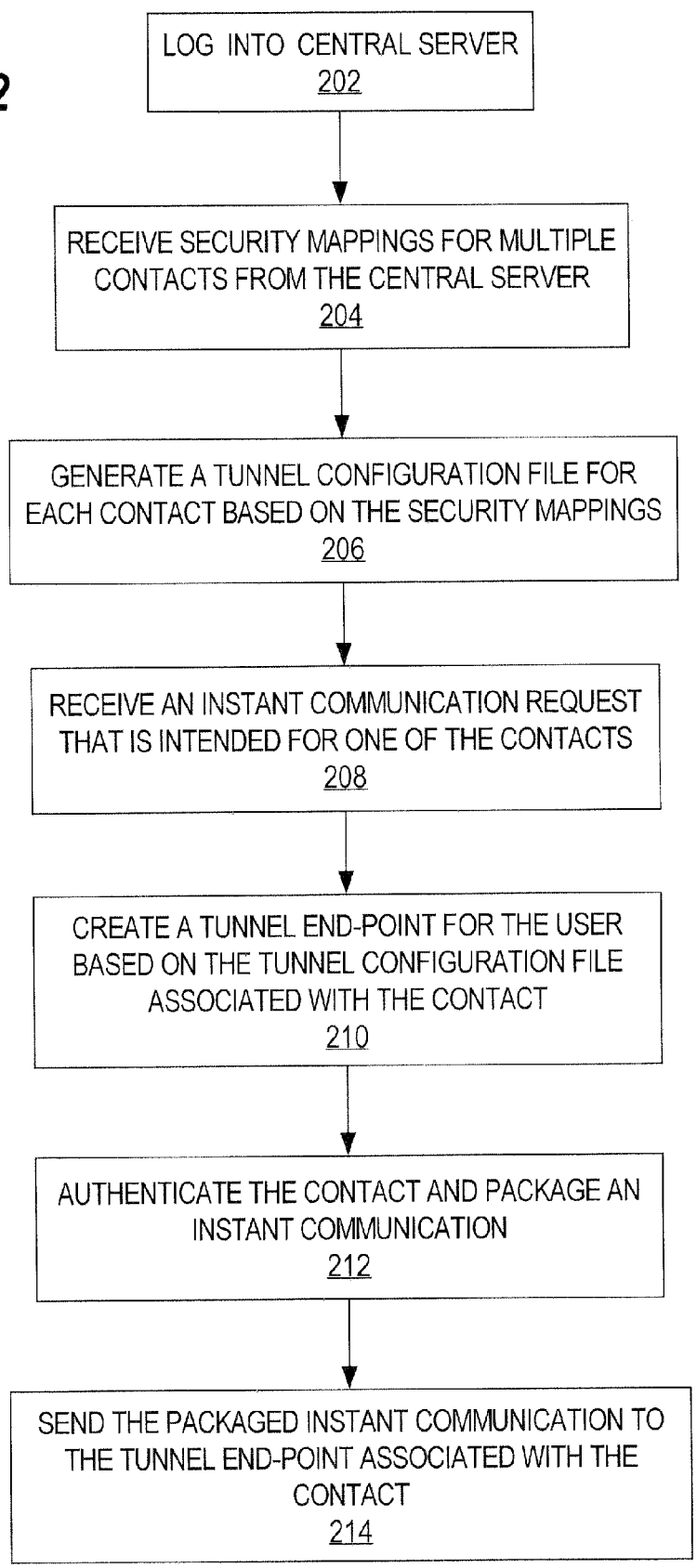
FIG. 2 is a flow diagram that illustrates steps that may be performed to send a secure instant communication, according to an embodiment of the invention.

FIG. 2 is a flow diagram that illustrates steps that may be performed to send a secure instant communication, according to an embodiment of the invention. At step 202, a user "opens" an instant communication suite installed on the user's computer and logs into a central server.

At step 204, the user receives security mappings from the central server for one or more contacts of the user. At step 206, a tunnel management module (TMM) of the instant communication suite generates a tunnel configuration file for each contact of the one or more contacts based on the security mappings.

At step 208, the TMM receives an instant communication request that is intended for one of the contacts of the user. Step 208 may comprise multiple steps. For example, the intended contact may reply to the request by sending its tunnel configuration file (or security mapping) for the user. Furthermore, any reconciliation of differences between the corresponding tunnel configuration files may be performed.

At step 210, the TMM creates a tunnel end-point of a tunnel based on the tunnel configuration file that is associated with the contact.

At step 212, the TMM authenticates the contact and packages an instant communication, e.g., by compressing, encrypting, and encapsulating the instant communication.

At step 214, the TMM sends the packaged instant communication to the tunnel end-point associated with the contact.

Benefits

A benefit of certain embodiments of the invention discussed above is the ability to secure additional types of instant communications without significant changes to the corresponding instant communication suite. Currently, in order to change the security level of an instant communication application, the application logic must be rewritten, which may cause errors. Embodiments of the invention do not require the application logic to be modified.

Another benefit of certain embodiments of the invention discussed above is the ability to provide different levels of security among contacts in instant communication, whereas, currently, the security policy of an instant communication application applies to all contacts of a user.

An additional benefit of certain embodiments of the invention includes the ability to support multiple tunnels between two communicating nodes. One tunnel may be created for text communication, one for voice, and one for video. Each tunnel may have its own configuration and security level without interfering with the other tunnels.

Hardware Overview

Figure 3:
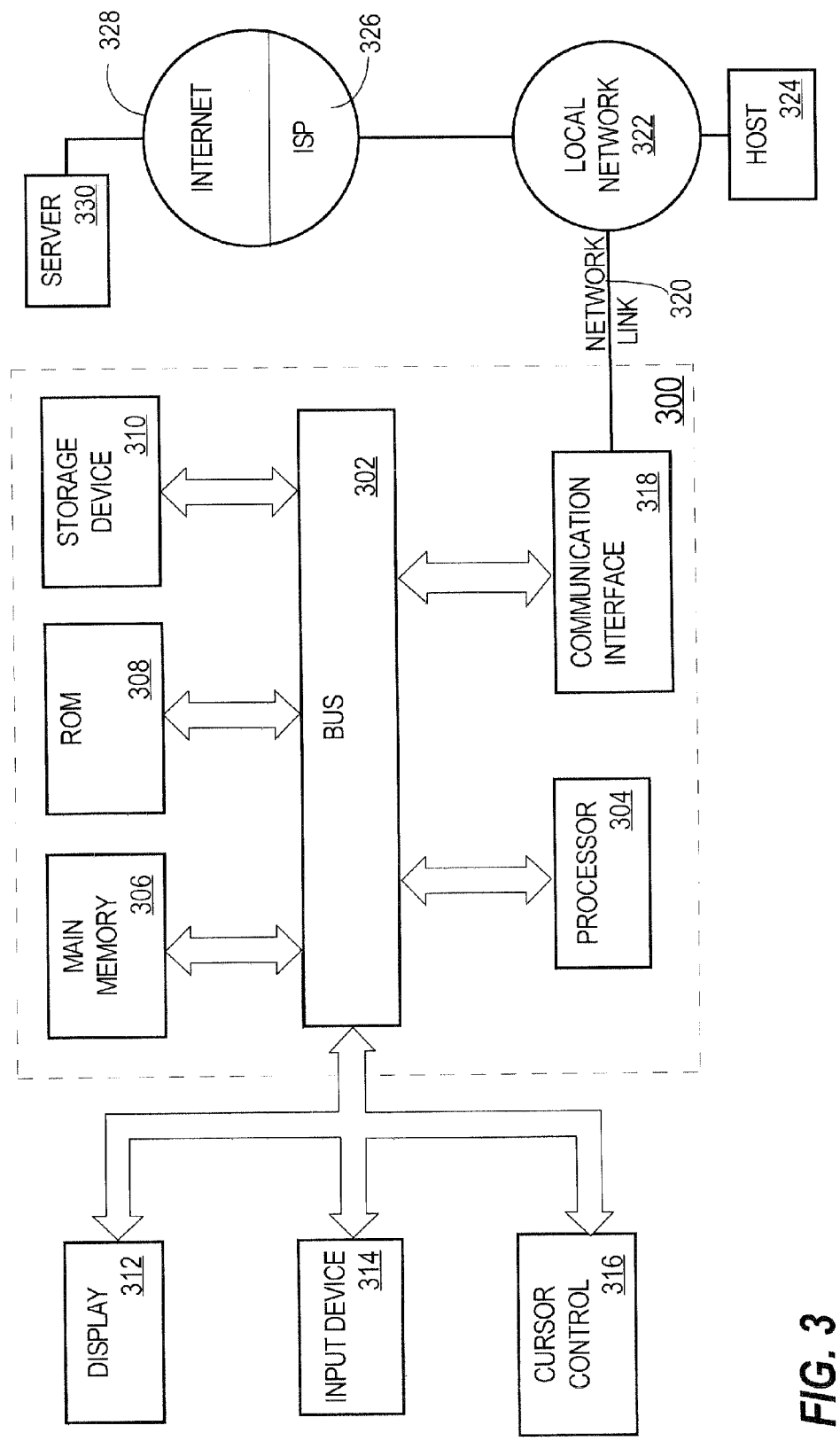
FIG. 3 is a block diagram of a computer system on which implementations of the present invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of providing security in instant communications, comprising, at a first node:
  receiving, over a network from a server, a security mapping;
  generating a tunnel configuration file based on the security mapping;
  associating a first set of security criteria with one or more contacts of a user;
  based on the first set of security criteria and the tunnel configuration file, a tunnel manager, executing at the first node, creating a first end-point of a first tunnel, wherein a second end-point of the first tunnel is associated with a second node that is different than the first node and that is associated with one of the one or more contacts;
  receiving, at the tunnel manager, a first instant communication from a first instant communication application executing at the first node;
  in response to receiving the first instant communication from the first instant communication application, the tunnel manager:
    based on the first set of security criteria, packaging the first instant communication, and
    sending the packaged first instant communication to the second end-point;
  based on a particular set of security criteria, the tunnel manager creating a first particular end-point of a particular tunnel, wherein a second particular end-point of the particular tunnel is associated with a particular node;
  receiving, at the tunnel manager, a second instant communication from a second instant communication application that is executing at the first node and that is different than the first instant communication application;
  in response to receiving the second instant communication from the second instant communication application, the tunnel manager:
    based on the particular set of security criteria, packaging the second instant communication, and
    sending the packaged second instant communication to the second particular end-point.

2. The method of claim 1, wherein:
a plurality of contacts have established a relationship with the user;
a particular contact of the plurality of contacts is associated with a second set of security criteria that is different than the first set of security criteria;
the particular contact is different than any of the one or more contacts;
the method further comprising, the tunnel manager:
based on the second set of security criteria, creating an end-point of a second tunnel that is different than the first tunnel, wherein another end-point of the second tunnel is associated with a third node that is associated with the particular contact,
receiving a third instant communication from an instant communication application executing at the first node,
based on the second set of security criteria, packaging the third instant communication, and
sending the packaged third instant communication to the other end-point.

3. One or more non-transitory machine-readable storage media storing instructions which, when executed by one or more processors, causes performance of the method recited in claim 2.

4. The method of claim 1, further comprising:
based on input from the user, the tunnel manager modifying the first set of security criteria to a second set of security criteria;
based on the second set of security criteria, creating an end-point of a second tunnel, wherein another end-point of the second tunnel is associated with the second node;
receiving, at the tunnel manager, a third instant communication from the first instant communication application;
in response to receiving the third instant communication from the first instant communication application, the tunnel manager:
based on the second set of security criteria, packaging the third instant communication, and
sending the packaged third instant communication to the other end-point.

5. One or more non-transitory machine-readable storage media storing instructions which, when executed by one or more processors, causes performance of the method recited in claim 4.

6. The method of claim 1, wherein a cryptographic protocol that defines how the first instant communication is secured is a Transport Layer Security (TLS) protocol.

7. One or more non-transitory machine-readable storage media storing instructions which, when executed by one or more processors, causes performance of the method recited in claim 6.

8. The method of claim 1, wherein the first instant communication application is one of a text messaging application, a voice over IP application, or a video over IP application.

9. One or more non-transitory machine-readable storage media storing instructions which, when executed by one or more processors, causes performance of the method recited in claim 8.

10. The method of claim 1, wherein the first instant communication includes a file attachment.

11. One or more non-transitory machine-readable storage media storing instructions which, when executed by one or more processors, causes performance of the method recited in claim 10.

12. The method of claim 1, wherein packaging the first instant communication includes at least one of compressing the first instant communication, encrypting the first instant communication, or encapsulating the first instant communication.

13. One or more non-transitory machine-readable storage media storing instructions which, when executed by one or more processors, causes performance of the method recited in claim 12.

14. One or more non-transitory machine-readable storage media storing instructions which, when executed by one or more processors, causes performance of the method recited in claim 1.

15. The method of claim 1, wherein the second instant communication application was installed on the first node after the first instant communication application was installed on the first node.

16. One or more non-transitory machine-readable storage media storing instructions which, when executed by one or more processors, causes performance of the method recited in claim 15.

17. A method of providing security in instant communications, comprising, at a first node:
associating a first set of security criteria with one or more contacts of a user;
based on the first set of security criteria, a tunnel manager, executing at the first node, creating a first end-point of a first tunnel, wherein a second end-point of the first tunnel is associated with a second node that is different than the first node and that is associated with one of the one or more contacts;
wherein the first set of security criteria is different than a second set of security criteria that is used by the second node to create the second end-point of the first tunnel;
sending, from the tunnel manager to the second node, an instruction to use the first set of security criteria to create the second end-point;
receiving, at the tunnel manager a first instant communication from a first instant communication application executing at the first node;
in response to receiving the first instant communication from the first instant communication application, the tunnel manager:
based on the first set of security criteria, packaging the first instant communication, and
sending the packaged first instant communication to the second end-point;
based on a particular set of security criteria, the tunnel manager creating a first particular end-point of a particular tunnel, wherein a second particular end-point of the particular tunnel is associated with a particular node;
receiving, at the tunnel manager, a second instant communication from a second instant communication application that is executing at the first node and that is different than the first instant communication application;
in response to receiving the second instant communication from the second instant communication application, the tunnel manager:
based on the particular set of security criteria, packaging the second instant communication, and
sending the packaged second instant communication to the second particular end-point.

18. One or more non-transitory machine-readable storage media storing instructions which, when executed by one or more processors, causes performance of the method recited in claim 17.

* * * * *